United States Patent [19]

Lockart et al.

[11] Patent Number: 5,132,029
[45] Date of Patent: Jul. 21, 1992

[54] METHOD AND COMPOSITION FOR REDUCING THE PERMEABILITY OF A HIGH-PERMEABILITY ZONE IN AN OIL RESERVOIR

[75] Inventors: Thomas P. Lockart, Milan; Giovanni Burrafato, both of Milan, Italy

[73] Assignees: Eniricerche S.p.A.; AGIP S.p.A., both of Milan, Italy

[21] Appl. No.: 642,157

[22] Filed: Jan. 17, 1991

Related U.S. Application Data

[63] Continuation of Ser. No. 499,789, Mar. 27, 1990, abandoned.

[30] Foreign Application Priority Data

Mar. 31, 1989 [IT] Italy .................. 19968 A/89

[51] Int. Cl.⁵ .................. E21B 33/138; E21B 43/22
[52] U.S. Cl. .................. 252/8.551; 166/281; 166/295; 166/300; 252/315.4; 523/130
[58] Field of Search .................. 166/270, 272, 273, 274, 166/288, 281, 294, 295, 300, 308; 252/8.551, 315.3, 315.4; 523/130, 131, 132

[56] References Cited

U.S. PATENT DOCUMENTS

| | | | |
|---|---|---|---|
| 3,615,794 | 10/1971 | Nimerick | 523/130 |
| 3,687,200 | 8/1972 | Routson | 166/275 |
| 3,795,276 | 3/1974 | Eilers et al. | 166/295 |
| 3,809,160 | 5/1974 | Routson | 166/294 |
| 4,018,286 | 4/1977 | Gall et al. | 166/295 |
| 4,290,485 | 9/1981 | Free et al. | 166/295 X |
| 4,534,412 | 8/1985 | Dovan et al. | 523/130 X |
| 4,606,407 | 8/1986 | Shu | 166/270 |
| 4,657,944 | 4/1987 | Bruning et al. | 523/130 |
| 4,658,898 | 4/1987 | Paul et al. | 166/295 X |
| 4,673,038 | 6/1987 | Sandiford et al. | 523/130 X |
| 4,723,605 | 2/1988 | Sydansk | 166/295 |
| 4,785,028 | 11/1988 | Hoskin et al. | 523/130 |

*Primary Examiner*—George A. Suchfield
*Attorney, Agent, or Firm*—Oblon, Spivak, McClelland, Maier & Neustadt

[57] ABSTRACT

A method for reducing the permeability of a high-permeability zone in a high-temperature oil reservoir comprises:

preparing a gellable polymeric aqueous solution, operating on the surface under controlled conditions;

injecting said gellable solution into the oil reservoir through a well;

moving the solution through the reservoir until it reaches and substantially fills the high-permeability zone to be treated; and gelling the solution in situ with consequent lowering of the permeability in said high-permeability zone, and is essentially characterized in that the gellable solution is an aqueous solution containing a Cr(III) ion cross-linking agent and a water-soluble organic polymer cross-linkable by the effect of said cross-linking agent, said solution being free or substantially free of ligands for the cross-linking agent and having a pH adjusted to a value within the range of 1.5 to 5.5, depending on the desired gelling time.

8 Claims, 1 Drawing Sheet

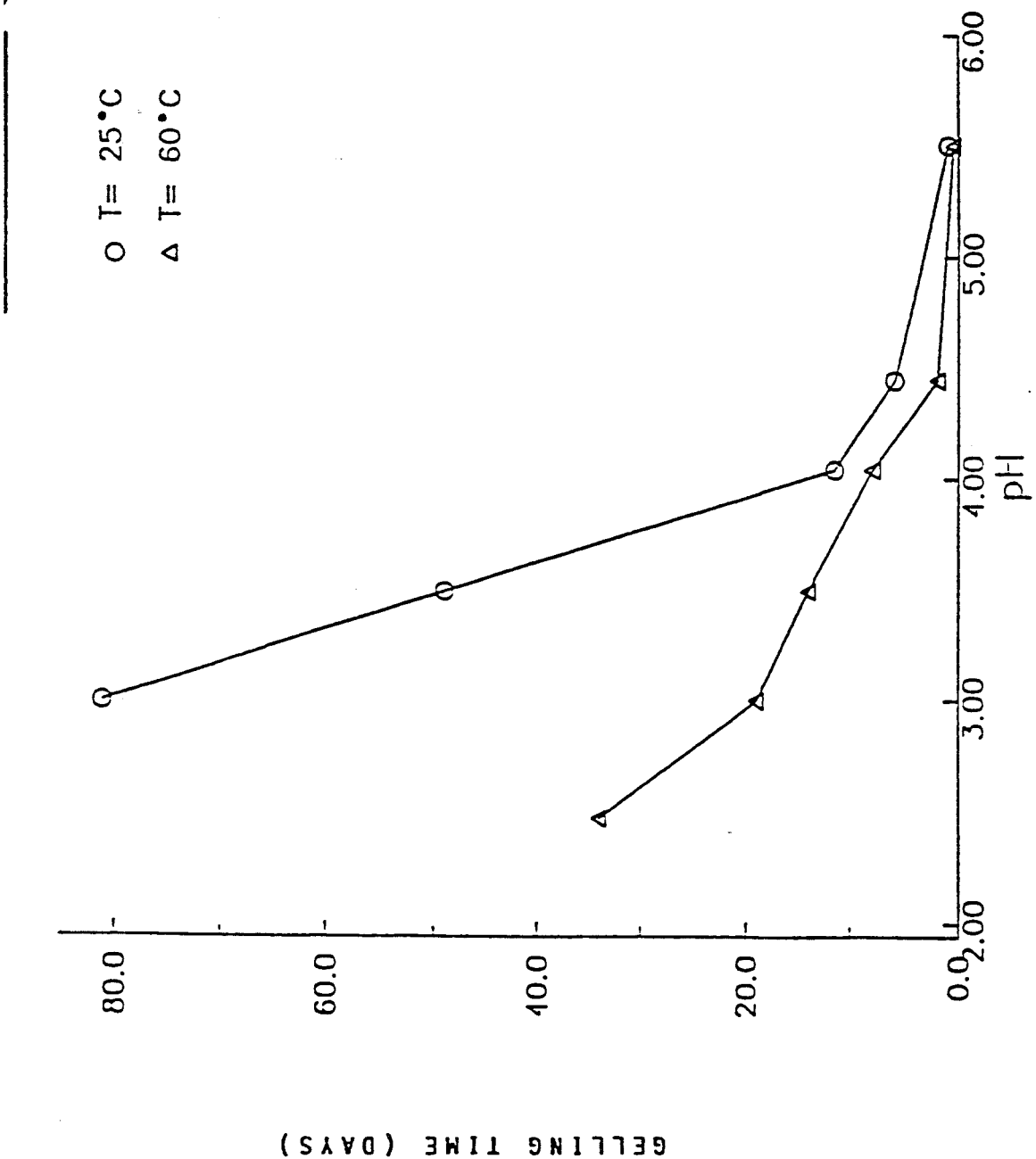

METHOD AND COMPOSITION FOR REDUCING THE PERMEABILITY OF A HIGH-PERMEABILITY ZONE IN AN OIL RESERVOIR

This application is a continuation Ser. No. 07/499,789 filed on Nov. 27, 1990, now abandoned.

This invention relates to a method for reducing the permeability of a high-permeability zone in an oil reservoir at high temperature, and a gellable aqueous composition suitable for the purpose.

The normal primary recovery methods for petroleum, which make use of its natural tendency to exit through wells drilled into the reservoir, are known to allow only partial extraction of the crude contained in an oil reservoir. To increase the extractable petroleum quantity it is therefore usual to employ secondary recovery techniques, consisting essentially of introducing into the reservoir a fluid, generally water or an aqueous polymer solution, which conveys the crude through the pores in the rock to the extraction well. However, because of the non-homogeneous state of petroleum-bearing rock, resulting in zones of different permeability, the injected fluid tends to be channelled through the zones of greater permeability, without flushing or only partly flushing the zones of lesser permeability. This behaviour limits the total quantity of petroleum recoverable from the reservoir by their fluid drive.

To solve this problem, use can be made of one of the techniques based on the at least partial occlusion of the high permeability zones by feeding an aqueous solution of a gellable polymer into the reservoir through one or more wells, to form polymer gels in situ. In this manner it is possible to deviate the flow of the fluid subsequently fed into the reservoir toward the zones of lesser permeability and thus recover the crude contained in them.

The gellable solutions used for this purpose are normally an aqueous solution of a water-soluble polymer such as a polyacrylamide, a partly hydrolyzed polyacrylamide, or a biopolymer such as xanthan gum, cross-linkable by the effect of an ion of a polyvalent metal, normally Cr(III). Moreover, as the zones to be occluded can be very large and/or at a more or less great distance from the injection well, the gelling solution must have a delayed gelation in order to allow the solution to reach the high permeability zones of the reservoir and to fill them completely. Such an operation can require a time period of between a few days and some months.

The problem of delayed gelling has been confronted in various ways. Thus, in one known method described for example in U.S. Pat. No. 3,785,437, an aqueous solution containing the cross-linkable polymer and a hexavalent chromium salt unable in itself to cross-link the polymer is injected into the reservoir. The chromium is then reduced to the trivalent state at a slow reduction rate by means of a reducing agent (such as thiourea or bisulphite) either contained in the gellable solution or injected into the reservoir in the form of an aqueous solution subsequent to the injection of the gellable solution, so as to induce gelling. This Cr(VI)/reductant method has the advantage that it is possible to obtain delayed gelation with a single component gellable composition; it has the drawback however of toxicity of hexavalent chromium and its consequent impact on the environment. In the case of sequential injection, the drawbacks include the incomplete mixing of the injected solutions, so that the gel forms only at their interface, and is therefore thin and easily deteriorates.

U.S. Pat. No. 3,762,476 describes a gellable composition useful for correcting permeability in an underground reservoir, which comprises a cross-linkable polymer and a cross-linking agent in the form of an ion of a polyvalent metal complexed with certain ions having sequestering and delaying characteristics. According to the description of this patent, the solution of the complexed cross-linking agent is injected into the reservoir after injecting the polymeric aqueous solution, and thus the aforesaid drawbacks inherent in sequential injection are not overcome.

U.S. Pat. No. 4,683,949 describes gellable aqueous compositions useful in petroleum assisted recovery methods which contain a water-soluble polyacrylamide and a cross-linking agent in the form of a Cr(III) complex with a carboxylate ion, and more particularly an aliphatic monocarboxylic acid ion, especially an acetate ion. The use of this composition avoids the problems relative to sequential injection, however the resultant delay in cross-linking is only modest. Consequently these compositions are unsuitable for positioning the gel deeply within the reservoir, as is often desired.

The inventors of the present invention have found that an aqueous acid solution containing a cross-linkable organic copolymer and the Cr(III) ion, but without ligands for the Cr(III) ion, is not substantially subject to gelling, or at least gels extremely slowly, under ambient temperature conditions (20°–30° C.). The inventor have also surprisingly found that when operating at high temperature, such a solution is able to form gels having good strength within a time which is suitable for practical application, said time depending on the pH of the gellable solution, within a certain pH range.

On the basis of these findings, the present inventors have devised a simple and convenient method and a gellable aqueous composition for implementing controllably delayed gelling in a high temperature oil reservoir, such as to obviate the aforesaid drawbacks of the known art.

In accordance therewith, one aspect of the present invention is a method for reducing the permeability of a high-permeability zone in a high-temperature oil reservoir, comprising:

preparing a gellable aqueous solution, operating on the surface under controlled conditions;

injecting said gellable solution into the oil reservoir through at least one well;

moving the solution through the reservoir until it reaches and substantially fills the high-permeability zone to be treated; and gelling the solution in situ with consequent lowering of the permeability of said high-permeability zone, and is essentially characterised in that said gellable solution is an aqueous solution containing between 1000 and 50,000 ppm of an organic polymer cross-linkable by the effect of the Cr(III) ion, and between 10 and 5000 ppm of a Cr(III) ion cross-linking agent in a weight ratio of between 1:1 and 1000:1; said solution being free or substantially free of ligands for the Cr(III) ion and having a pH adjusted to a value within the range of 1.5 to 5.5, depending on the desired gelling time.

A further aspect of the present invention is the gellable aqueous composition having the aforesaid characteristics.

In the present description, ppm means parts per million by weight. Water-soluble polymers useful for the purposes of the present invention are water-soluble biopolymers and synthetic polymers of high molecular weight able to gel in the presence of the cross-linking agent at high temperature, within the aforesaid pH range. Examples of biopolymers are xanthan gum, guar gum, carboxymethyl cellulose, hydroxyethyl cellulose, hydroxypropyl cellulose and modified starches. Synthetic polymers useful for the purpose include acrylamide polymers such as polyacrylamide, partially hydrolyzed polyacrylamide and the copolymers of acrylamide with one or more copolymerizable monomers. The weight average molecular weight of these polymers and copolymers can generally vary from 100,000 to 20,000,000 and their concentration in the composition can vary from 1000 to 50,000 ppm. In the preferred embodiment, polyacrylamide polymers or their partial hydrolysis products with a weight average molecular weight of between 200,000 and 12,000,000 are used, in a concentration varying from 4000 to 30,000 ppm.

The cross-linking agent useful for the purposes of the present invention is the Cr(III) ion which is provided in the form of water-soluble trivalent chromium salts such as the chloride, nitrate or sulphate salts. The concentration of the cross-linking agent in the gellable solution, expressed as metal, can vary between 10 and 5000 ppm and preferably between 25 and 500 ppm. In addition the weight ratio of the water-soluble organic polymer to the cross-linking agent is maintained at between 1:1 and 1000:1, and preferably between 25:1 and 500:1.

The gellable solution according to the present invention has a pH of between 1.5 and 5.5, pH adjustment being effected by adding a mineral acid without binding characteristics for the Cr(III) ion, such as hydrochloric, nitric or perchloric acid.

The aforesaid solutions gel at high temperture with a gelling delay time depending on the chosen pH value for any given temperature. High temperature means a temperature varying from 40° to 200° C. and normally of the order of 50°-150° C. Many oil reservoirs have temperatures within this range. The gelling delay time is greater the lower the initial pH of the gellable solution, and can vary from about one day to some tens of days as the pH passes from the higher to the lower value of the given range. This variation in the gelling time as a function of pH is fairly regular, so that the gelling time of the gellable aqueous solution can be predetermined with good accuracy. From a practical aspect it should be noted that even in the case of reservoirs at the highest temperatures the gelling delays obtainable at the lower end of the pH range enable the gellable solution to be injected without the risk of triggering gelling in the injection well before the solution has time to enter the reservoir.

According to a particular embodiment the reservoir is flushed with one or more feeds of an aqueous solution of mineral acid chosen from the aforesaid, before injecting the gellable aqueous solution. This expedient is particularly useful in the case of alkaline reservoirs which otherwise might raise the pH of the injected gellable aqueous solution. Without wishing to support a particular theory, it is considered that the delaying effect observed in implementing the present invention is based on the chemistry of Cr(III) in aqueous solution. At the lower pH values (pH<3), the monomer $Cr(H_2O)_6^{3+}$ is the predominant species, whereas at pH values exceeding about 3 oligomerization of the Cr(III) takes place.

Within the pH range of 5.5-7.0 (depending on the Cr(III) concentration), chemically inert, insoluble $Cr(OH)_3 \cdot 3H_2O$ begins to form. It is known that the rate of exchange between the water of coordination and the ligands (such as the polymer functional groups) depends on the pH. Thus in the case of the present invention it appears that the slow gelling at least at the lower pH values depends on this slow ligand exchange rate.

The invention is further illustrated by the following experimental example.

EXAMPLE

Aqueous solutions are prepared in deionized water containing 8000 ppm of a commercial polyacrylamide (1% hydrolysis, weight average molecular weight 5,000,000-6,000,000) and 50 ppm ($9.6 \times 10^{-4}$M) of Cr(III) supplied in the form of Cr(III) chloride, their pH being adjusted to the desired value by adding a suitable quantity of perchloric acid. The time in days for these solutions to gel at 60° C. is determined. For comparison purposes the gelling progress at 25° C. is also reported. The results of these tests are given in the following table.

| Solution pH | Gelling time (days) | |
| --- | --- | --- |
| | 25° C. | 60° C. |
| 2.47 | — | 34 |
| 3.00 | 81 | 19 |
| 3.49 | 49 | 14 |
| 4.04 | 11 | 8 |
| 4.44 | 6 | 2 |
| 5.50 | 1 | 0.5 |

The results are also shown graphically in the FIGURE in which the horizontal axis represents the pH of the gellable aqueous solution and the vertical axis the gelling time in days. The graph shows the progressive increase in gelling time as the pH of the gellable aqueous solution decreases, when operating at 60° C. When operating at 25° C. there is no substantial gelling at the lower pH values.

This absence or substantial absence of gelling of the compositions at ambient temperature is an advantage in that the solutions can be prepared and stored at ambient temperature before injection into the well, without the danger of premature gelling.

We claim:
1. A gellable composition, consisting essentially of:
(A) from 1,000 to 50,000 parts per million of a water-soluble, partially hydrolyzed polyacrylamide polymer,
(B) from 10 to 5,000 parts per million of a Cr(III)-based cross-linking agent selected from the group consisting of chromium (III) chlorides, chromium (III) nitrates and chromium (III) sulfates,
(C) an acid selected from the group consisting of hydrochloric acid, nitric acid and perchloric acid, and
(D) the balance water, said polyacrylamide polymer and said cross-linking agent being present in a weight ratio of from 1:1 to 1,000:1, respectively, and said acid being present in an amount sufficient to adjust the pH of said gellable composition to a value of from 1.5 to 5.5, such that said gellable composition is able to reduce the permeability of a high-permeability zone in a high-temperature oil reservoir.

2. The gellable composition of claim 1, wherein said polyacrylamide has a weight average molecular weight of between 100,000 and 20,000,000.

3. The gellable composition of claim 2, wherein said weight average molecular weight is from 200,000 to 12,000,000.

4. The gellable composition of claim 1, wherein said polyacrylamide polymer is present in an amount of from 4,000 to 30,000 parts per million.

5. The gellable composition of claim 1, wherein said Cr(III)-based cross-linking agent is present in an amount of from 20 to 500 parts per million.

6. The gellable composition of claim 1, wherein said weight ratio of said polyacrylamide polymer to said Cr(III)-based cross-linking agent is from 5:1 to 500:1.

7. The gellable composition of claim 1, wherein said composition is injected into a high-permeability zone of an oil reservoir, said oil reservoir having a temperature of from 40° to 200° C.

8. The gellable composition of claim 7, wherein said temperature is from 50° to 150° C.

* * * * *